(12) United States Patent
Fujiki

(10) Patent No.: US 12,626,341 B2
(45) Date of Patent: May 12, 2026

(54) PROCESSOR, DISPLAY CONTROL METHOD, AND DISPLAY CONTROL PROGRAM

(71) Applicant: FUJIFILM Corporation, Tokyo (JP)

(72) Inventor: Shinichiro Fujiki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/443,760

(22) Filed: Feb. 16, 2024

(65) Prior Publication Data

US 2024/0289931 A1 Aug. 29, 2024

(30) Foreign Application Priority Data

Feb. 28, 2023 (JP) ................................. 2023-030564

(51) Int. Cl.
　*G06T 5/80*　　　(2024.01)
　*G06T 3/14*　　　(2024.01)
　*G09G 3/00*　　　(2006.01)
(52) U.S. Cl.
　CPC .................. *G06T 5/80* (2024.01); *G06T 3/14* (2024.01); *G09G 3/001* (2013.01); *G09G 2340/0485* (2013.01)
(58) Field of Classification Search
　CPC . G06T 5/80; G06T 3/14; G09G 3/001; G09G 2340/0485
　See application file for complete search history.

(56) References Cited

U.S. PATENT DOCUMENTS

| | | | |
|---|---|---|---|
| 2015/0153572 A1* | 6/2015 | Miao .................... | G02B 27/017 |
| | | | 359/630 |
| 2015/0168728 A1 | 6/2015 | Kobayashi | |
| 2016/0033770 A1 | 2/2016 | Fujimaki et al. | |
| 2016/0240125 A1 | 8/2016 | Sridharan et al. | |
| 2016/0284129 A1* | 9/2016 | Nishizawa .............. | G06F 3/013 |
| 2018/0330481 A1* | 11/2018 | Watanabe ................ | G06T 7/00 |
| 2020/0271447 A1* | 8/2020 | Aoki ...................... | G01B 11/00 |
| 2022/0060680 A1 | 2/2022 | Kawamae et al. | |

FOREIGN PATENT DOCUMENTS

JP　　　2020-204856 A　　　12/2020

OTHER PUBLICATIONS

Extended European Search Report for corresponding European Application No. 24158166.9, dated Jun. 17, 2024.

* cited by examiner

*Primary Examiner* — Nathan P Brittingham
(74) *Attorney, Agent, or Firm* — Birch, Stewart, Kolasch & Birch, LLP

(57) ABSTRACT

A processor, which is included in a glasses-type display device that allows at least one eye of a user to visually recognize a real space and that displays a captured image obtained by imaging the real space with a camera, performs display processing of displaying a partial image, which is a partial region of the captured image captured by the camera, in a manner visually recognizable by the user based on a parallax between the eye of the user and the camera.

12 Claims, 6 Drawing Sheets

START

ACQUIRE CAPTURED IMAGE — S100

DERIVE MISREGISTRATION AMOUNT — S102

DETERMINE CUTOUT RANGE — S104

CUT OUT PARTIAL IMAGE — S106

GIVE INSTURCTION TO DISPLAY PARTIAL IMAGE — S108

S110

N    END?

Y

END

PROCESSOR, DISPLAY CONTROL METHOD, AND DISPLAY CONTROL PROGRAM

CROSS REFERENCE TO RELATED APPLICATIONS

This application claims priority from Japanese Application No. 2023-030564, filed on Feb. 28, 2023, the entire disclosure of which is incorporated herein by reference.

BACKGROUND

1. Technical Field

The present disclosure relates to a processor, a display control method, and a non-transitory storage medium storing a display control program.

2. Description of the Related Art

A glasses-type display device such as an augmented reality (AR) device that allows a user to visually recognize a display image together with a real space is known in the related art.

A technology in which a captured image is visually recognized by AR glasses by imaging a real space visually recognized by a user with a camera and by displaying the obtained captured image as a projection image is known. For example, JP2020-204856A discloses a technology for projecting a captured image obtained by imaging a visual line direction of a wearer of a head-mounted display onto a retinal display.

SUMMARY

However, in the technology according to the related art, in a case in which a position of an eye of a user who visually recognizes the real space is deviated from a position of a camera, parallax occurs. Therefore, a real image visually recognized by the user and the captured image captured by the camera may look different. In such a case, for example, the user feels a sense of incongruity.

The present disclosure has been made in view of the above circumstances, and an object of the present disclosure is to provide a processor, a display control method, and a non-transitory storage medium storing a display control program that can suppress the deviation between the real image visually recognized by the user and the captured image in a case in which the user visually recognizes the captured image captured by the camera together with the real space.

In order to achieve the above object, a processor according to a first aspect of the present disclosure, which is included in a glasses-type display device that allows at least one eye of a user to visually recognize a real space and that displays a captured image obtained by imaging the real space with a camera, performs display processing of displaying a partial image, which is a partial region of the captured image captured by the camera, in a manner visually recognizable by the user based on a parallax between the eye of the user and the camera.

According to a processor of a second aspect of the present disclosure, in the processor of the first aspect, the processor determines a range in which the partial image is cut out based on a subject distance to a main subject included in the captured image and the parallax.

According to a processor of a third aspect of the present disclosure, in the processor of the second aspect, the processor determines a display size of the partial image based on the subject distance.

According to a processor of a fourth aspect of the present disclosure, in the processor of the first aspect, the parallax is a parallax between the eye of the user that visually recognizes the real space and the camera.

According to a processor of a fifth aspect of the present disclosure, in the processor of the first aspect, the processor determines, according to the parallax between the one eye of the user and the camera, a region corresponding to the real space visually recognized with the one eye of the user as a range in which the partial image is cut out, and the processor displays the cut partial image in a manner visually recognizable by an eye other than the one eye of the user in the display processing.

According to a processor of a sixth aspect of the present disclosure, in the processor of the fifth aspect, the processor displays the partial image in an entire visual field of the eye other than the one eye of the user in the display processing.

According to a processor of a seventh aspect of the present disclosure, in the processor of the first aspect, the processor determines, according to the parallax between the one eye of the user and the camera, a region corresponding to the real space visually recognized with the one eye of the user as a range in which the partial image is cut out, and the processor displays the cut partial image in a manner visually recognizable by the one eye of the user in the display processing.

According to a processor of an eighth aspect of the present disclosure, in the processor of the seventh aspect, the processor displays the partial image in a part in a visual field of the one eye of the user in the display processing.

According to a processor of a ninth aspect of the present disclosure, in the processor of the eighth aspect, the processor performs cutting-out of the partial image and the display processing corresponding to each of a plurality of eyes of the user.

According to a processor of a tenth aspect of the present disclosure, in the processor of the ninth aspect, the partial image is a live view image.

In order to achieve the above object, a display control method according to an eleventh aspect of the present disclosure is a method comprising: via a processor included in a glasses-type display device that allows at least one eye of a user to visually recognize a real space and that displays a captured image obtained by imaging the real space with a camera, performing display processing of displaying a partial image, which is a partial region of the captured image captured by the camera, in a manner visually recognizable by the user based on a parallax between the eye of the user and the camera.

In order to achieve the above object, a non-transitory storage medium storing a display control program according to a twelfth aspect of the present disclosure is a program causing a processor, which is included in a glasses-type display device that allows at least one eye of a user to visually recognize a real space and that displays a captured image obtained by imaging the real space with a camera, to execute a process comprising: performing display processing of displaying a partial image, which is a partial region of the captured image captured by the camera, in a manner visually recognizable by the user based on a parallax between the eye of the user and the camera.

According to the present disclosure, it is possible to suppress the deviation between the real image visually recognized by the user and the captured image in a case in which the user visually recognizes the captured image captured by the camera together with the real space.

DESCRIPTION OF EMBODIMENTS

Hereinafter, examples of an embodiment for implementing the technology of the present disclosure will be described in detail with reference to the drawings.

Figure 1:
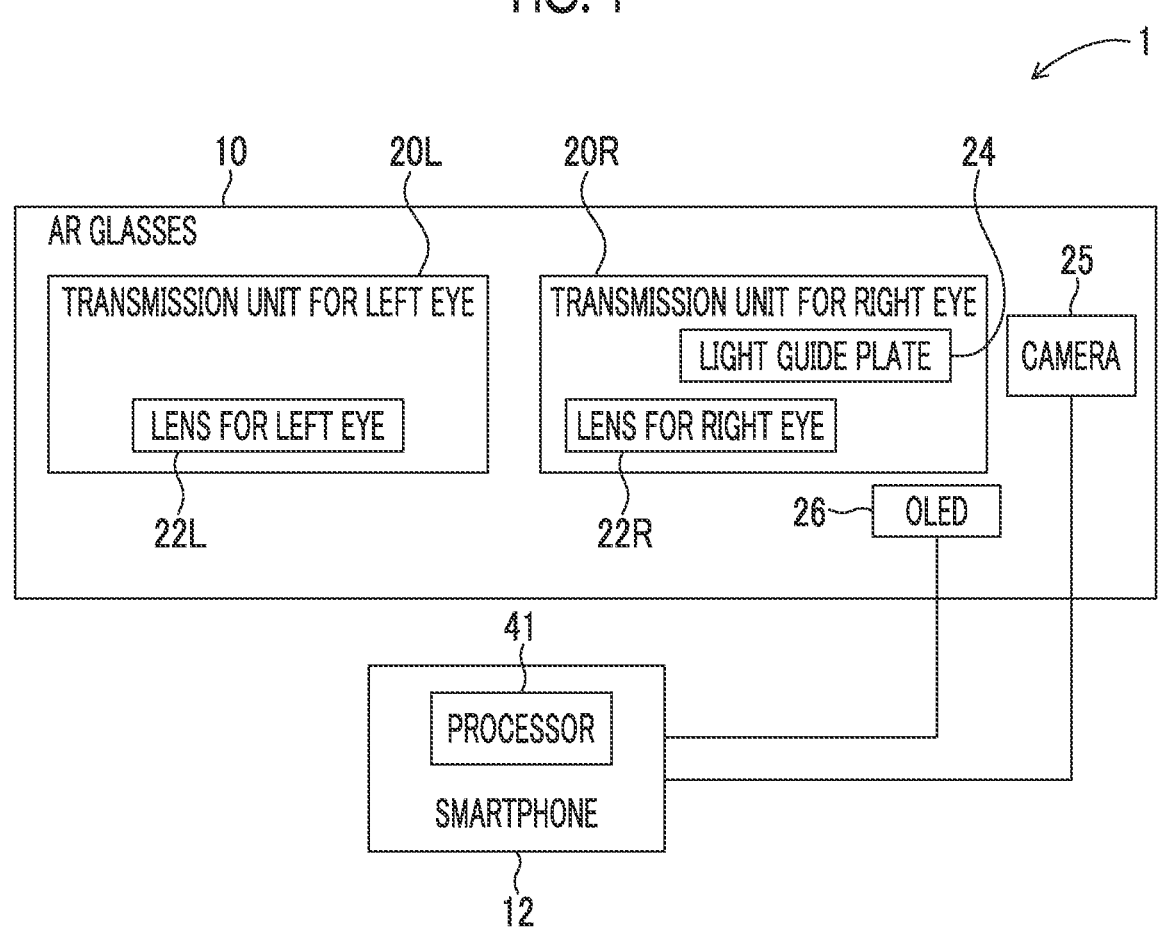
FIG. 1 is a configuration diagram showing an example of a configuration of a glasses-type information display device according to an embodiment.

The configuration of a glasses-type information display device 1 according to the present embodiment will be described with reference to FIG. 1. As shown in FIG. 1, the glasses-type information display device 1 according to the present embodiment comprises augmented reality (AR) glasses 10 and a smartphone 12. The glasses-type information display device 1 of the present embodiment has a function of displaying a captured image, which is obtained by imaging a real space by the camera 25 of the AR glasses 10, through the AR glasses 10.

Figure 2:
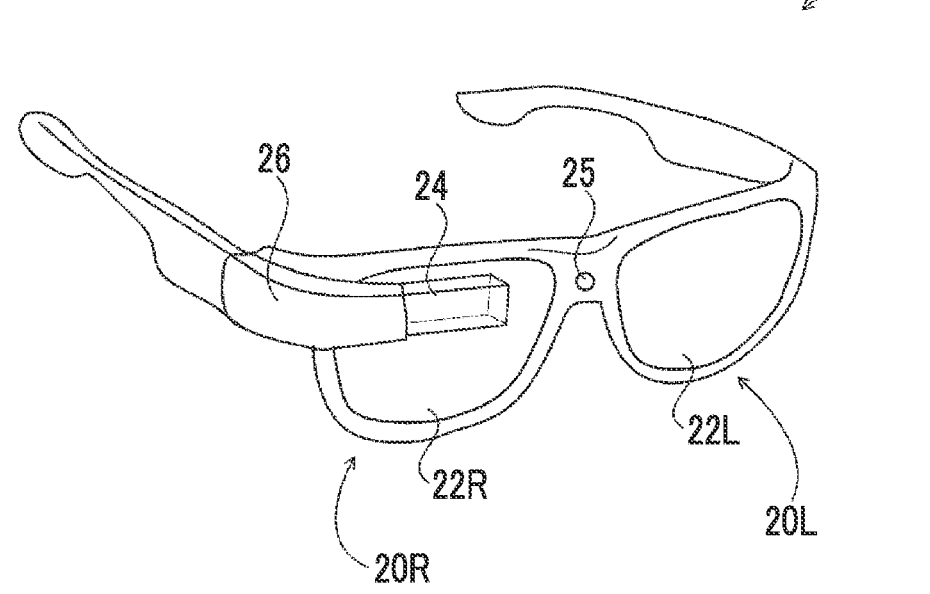
FIG. 2 is a perspective view showing an example of AR glasses according to the embodiment.

The AR glasses 10 are a device that allows a user to visually recognize a projection image, which is projected from an organic light emitting diode (OLED) 26, in a state in which the projection image is superimposed on a real image. FIG. 2 is a perspective view of an example of the AR glasses 10 of the present embodiment. As shown in FIGS. 1 and 2, the AR glasses 10 comprise a pair of a transmission unit 20L for a left eye and a transmission unit 20R for a right eye, a camera 25, and an OLED 26.

The camera 25 is a camera that images the real space observed by the user of the AR glasses 10. The camera 25 of the present embodiment is provided between the right eye and the left eye of the user. Examples of the camera 25 include a digital camera such as a complementary metal oxide semiconductor (CMOS) camera. As an example, the camera 25 of the present embodiment can capture a motion picture. In the present embodiment, the "captured image" refers to an image captured by the camera 25, and may be a still image or a motion picture.

The OLED 26 projects the projection image, which represents information, onto the transmission unit 20R for a right eye in order to insert information into the visual field of a real image, which is visually recognized by the user through the transmission unit 20R for a right eye, in a superimposed manner. The transmission unit 20R for a right eye includes a lens 22R for a right eye and a light guide plate 24. Light corresponding to the projection image projected from the OLED 26 is incident on one end of the light guide plate 24. The direction of light propagated through the light guide plate 24 is changed at an emission portion (not shown), and the light is emitted in a direction of the user's eye. The light, which is emitted from the light guide plate 24 and corresponds to the projection image, is transmitted through the lens 22R for a right eye, is guided to the right eye of the user, and is visually recognized as a projected image with the right eye. In addition, the user visually recognizes a real space, which is shown through the lens 22R for a right eye, as a real image with the right eye.

For this reason, while the projection image is projected from the OLED 26, the visually-recognized image visually recognized with the right eye of the user is in a state in which the projected image according to the projection image projected onto the light guide plate 24 is superimposed on the real image representing the real space shown through the lens 22R for a right eye. In addition, while the projection image is not projected from the OLED 26, the visually-recognized image visually recognized by the user is the real image that represents the real space shown through the lens 22R for a right eye and the light guide plate 24.

In the present embodiment, by projecting the captured image captured by the camera 25 as a projection image, the AR glasses 10, more specifically, the light guide plate 24 can be used as a finder of the camera 25, and the user visually recognizes the real space and the captured image with the right eye. A visually-recognized image which is visually recognized with the right eye of the user is in a state in which a projected image corresponding to the captured image is superimposed on the real image representing the real space. In the present embodiment, in a case in which the AR glasses 10 are used as the finder of the camera 25, a captured image 60 is displayed as a live view image.

Meanwhile, the transmission unit 20L for a left eye includes a lens 22L for a left eye. The user visually recognizes the real space, which is shown through the lens 22L for a left eye, with the left eye.

On the other hand, the smartphone 12 comprises a processor 41. The CPU 40 of the present embodiment controls the OLED 26 to project the projection image onto the light guide plate 24 from the OLED 26.

Figure 3:
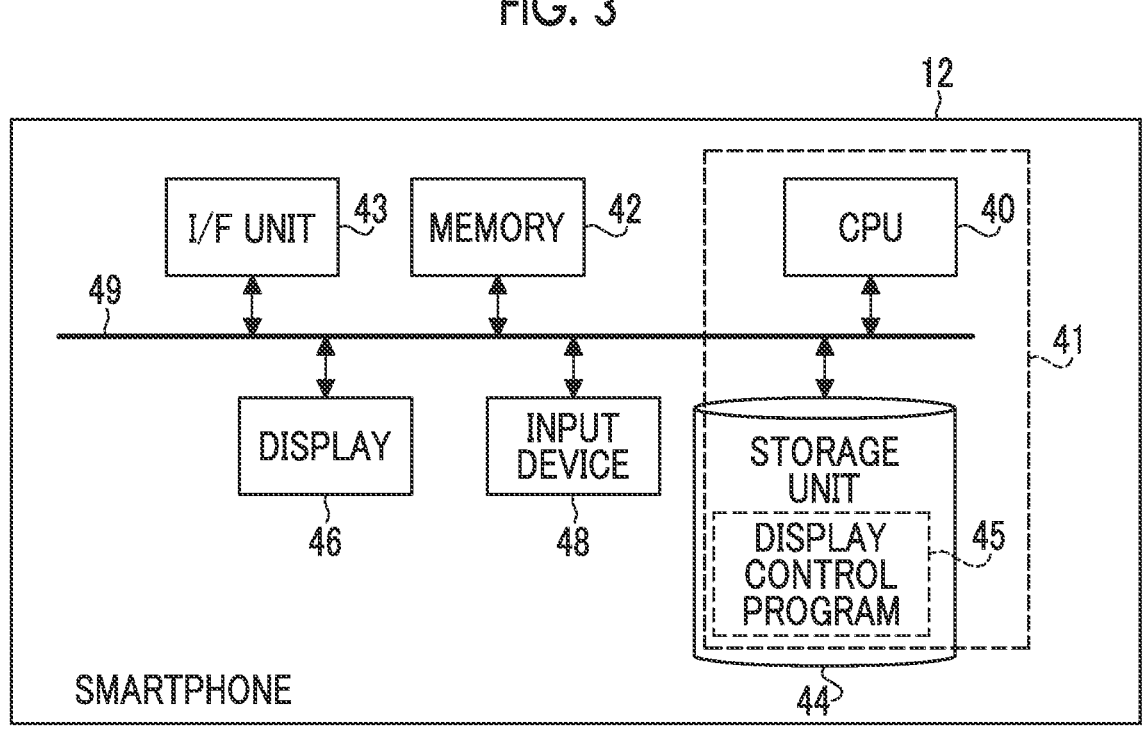
FIG. 3 is a block diagram showing an example of a hardware configuration of the smartphone according to the embodiment.

FIG. 3 shows a block diagram showing an example of a hardware configuration of the smartphone 12. As shown in FIG. 3, the smartphone 12 comprises the CPU 40, a memory 42, an interface (I/F) unit 43, a storage unit 44, a display 46, and an input device 48. The CPU 40, the memory 42, the I/F unit 43, the storage unit 44, the display 46, and the input device 48 are connected to each other via a bus 49, such as a system bus or a control bus, such that various types of information can be given and received therebetween.

The CPU 40 reads out various programs, which include a display control program 45 stored in the storage unit 44, to the memory 42 and performs processing according to the read program. Accordingly, the CPU 40 performs a control of the display of the projected image by the OLED 26. As an example, the processor 41 of the present embodiment is composed of a combination of the CPU 40 and the display control program 45. The memory 42 is a work memory that is used in a case in which the CPU 40 performs processing.

The display control program 45 executed in the CPU 40 is stored in the storage unit 44. In addition, a captured image captured by the camera 25, image data (not shown) of another projection image projected from the OLED 26, various other types of information, and the like are stored in the storage unit 44. Specific examples of the storage unit 44 include a hard disk drive (HDD), a solid state drive (SSD), and the like.

The I/F unit 43 communicates various types of information with each of the camera 25 and the OLED 26 via wireless communication or wired communication. The display 46 and the input device 48 function as a user interface. The display 46 provides various types of information, which is related to the projection of the projection image, to a user. The display 46 is not particularly limited, and examples of the display 46 include a liquid crystal monitor, a light emitting diode (LED) monitor, and the like. The input device 48 is not particularly limited, and examples of the input device 48 include a keyboard, a touch pen, a mouse, and the like. A touch panel display in which the display 46 and the input device 48 are integrated with each other is employed in the smartphone 12.

Figure 4:
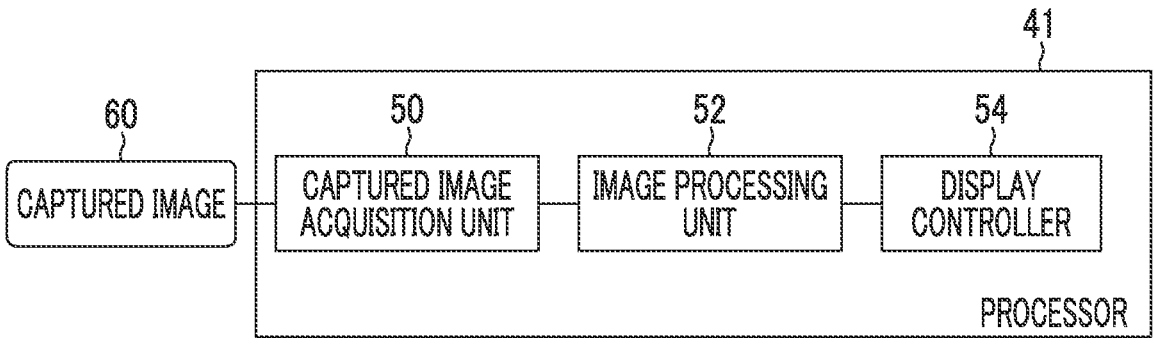
FIG. 4 is a block diagram showing an example of a configuration of the processor according to the embodiment.

In addition, the function of the processor 41 of smartphone 12 of the present embodiment will be described. FIG. 4 shows a functional block diagram showing an example of a configuration related to the function of the processor 41 of the present embodiment. As shown in FIG. 4, the processor 41 comprises a captured image acquisition unit 50, an image processing unit 52, and a display controller 54. As an example, in the processor 41 of the present embodiment, the CPU 40 executes the display control program 45 stored in the storage unit 44, so that the CPU 40 functions as the captured image acquisition unit 50, the image processing unit 52, and the display controller 54.

The captured image acquisition unit 50 has a function of acquiring the captured image 60. As an example, the smartphone 12 of the present embodiment acquires the image data of the captured image 60 captured by the camera 25, and stores the image data in the storage unit 44. Therefore, the captured image acquisition unit 50 acquires the captured image 60 from the storage unit 44. In the present embodiment, imaging by the camera 25 is performed from the time the power is turned on to the time the power is turned off in the camera 25, and image data representing the captured image is input at any time through the I/F unit 43 and is temporarily stored in the storage unit 44. Therefore, the captured image acquisition unit 50 acquires the captured image 60 from the storage unit 44. The captured image acquisition unit 50 outputs the acquired captured image 60 to the image processing unit 52.

Figures 5, 6:
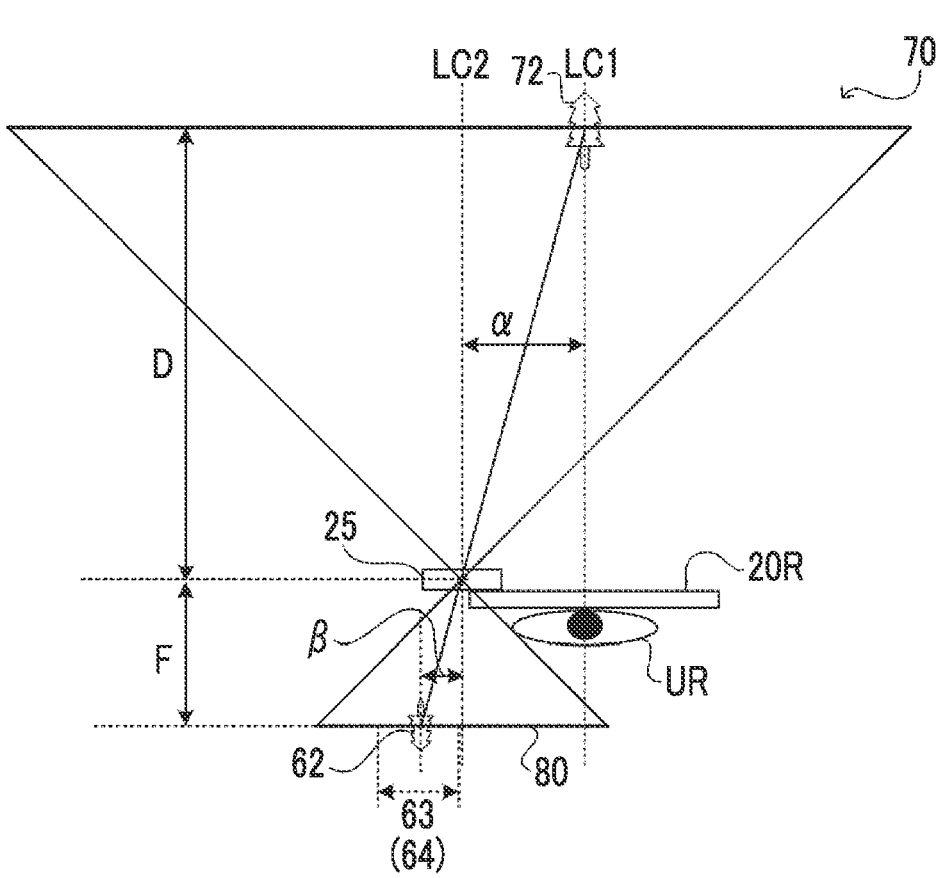
FIG. 5 is a diagram for explaining an example of a parallax between a camera and an eye of a user.
FIG. 6 is a diagram for explaining an example of a deviation between a real image obtained by a user's visual recognition of a real space and a captured image.

The image processing unit 52 has a function of performing image processing of cutting out a partial image, which is a partial region of the captured image 60 based on the parallax between the user's eye and the camera 25. The function of the image processing unit 52 will be described with reference to FIGS. 5 to 7. In the present embodiment, as shown in FIG. 2, the camera 25 is provided between the right eye and the left eye of the user. Therefore, as shown in FIG. 5, a parallax $\alpha$ occurs between a right eye UR of the user and the camera 25 (image sensor). Specifically, the parallax a corresponds to an interval between a center line LC1 of the right eye UR of the user and a center line LC2 of an imaging surface 80 of the image sensor of the camera 25.

Since the parallax $\alpha$ occurs in this way, as shown in FIG. 6, a deviation occurs between a real image 76R obtained in a case in which the user's right eye UR visually recognizes the real space 70 and the captured image 60 according to the parallax a. In the example shown in FIG. 6, misregistration corresponding to a misregistration amount $\beta$ shown in FIG. 5 occurs between a position of a subject image 73 in the real image 76R and a position of a subject image 62 in the captured image 60.

Specifically, the misregistration amount $\beta$ can be derived using the following equation (1) using the parallax $\alpha$, a subject distance D between the camera 25 and the subject 72, and a focal length F of the camera 25.

$$\beta = \alpha \times (F \div D) \tag{1}$$

The focal length F is predetermined according to the specifications of the camera 25, and the parallax $\alpha$ is determined as a design value of the AR glasses 10. As an example, the focal length F and the parallax $\alpha$ are stored in the storage unit 44. Therefore, the image processing unit 52 acquires the focal length F and the parallax $\alpha$ from the storage unit 44. On the other hand, the subject distance D can be obtained by an autofocus function of the camera 25. As an example, in the present embodiment, the subject distance D is associated with the captured image 60 acquired by the captured image acquisition unit 50, and the subject distance D is acquired by the captured image acquisition unit 50 together with the captured image 60.

Figures 7, 8:
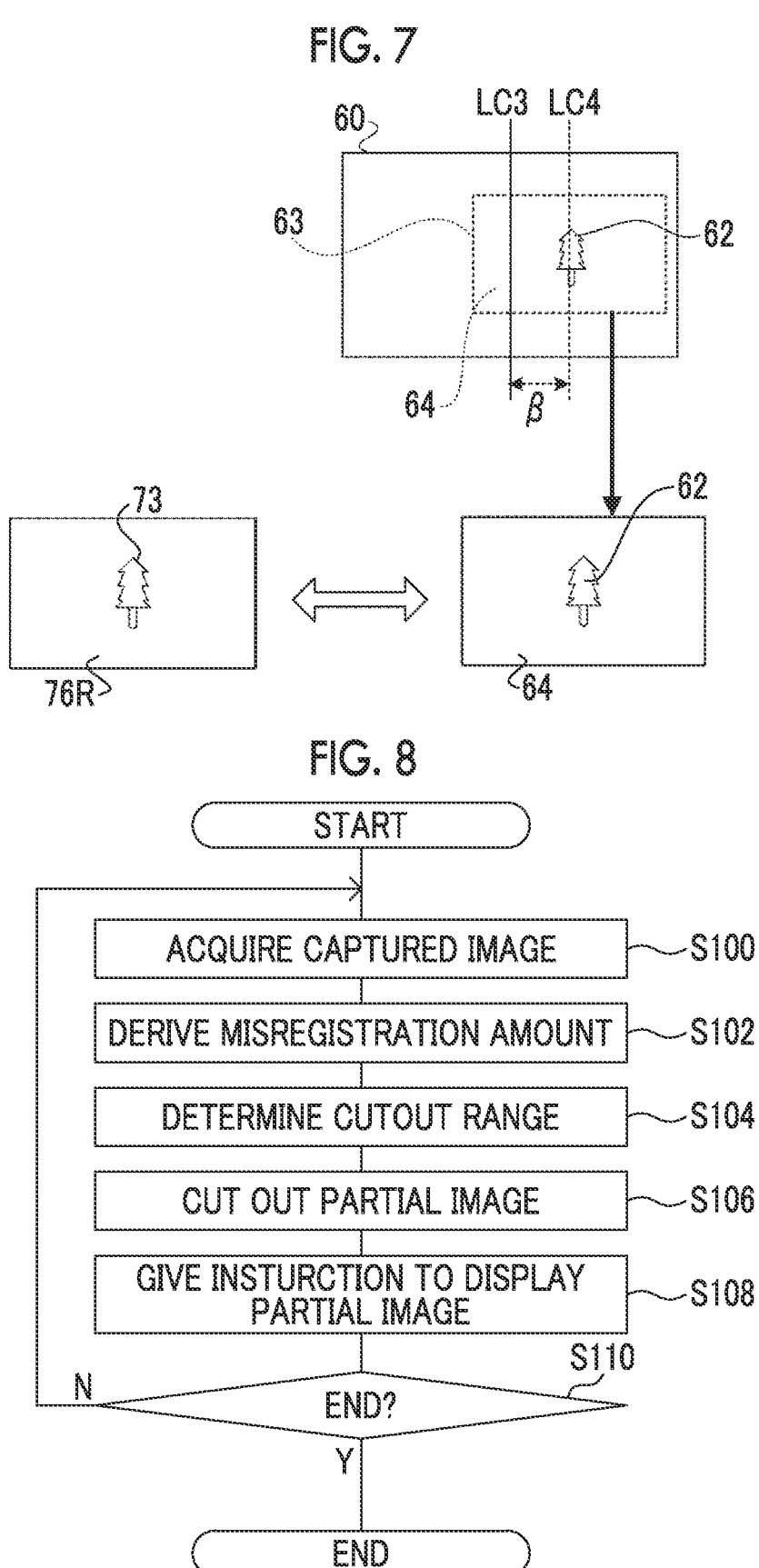
FIG. 7 is a diagram for explaining an example of a method of cutting out a partial image from the captured image.
FIG. 8 is a flowchart showing an example of display control processing executed by the processor according to the embodiment.

In this way, since the parallax $\alpha$ occurs between the right eye UR of the user and the camera 25, the image processing unit 52 cuts out a partial region from the captured image 60 as a partial image 64 based on the parallax $\alpha$ so as to cancel the misregistration amount $\beta$, as shown in FIG. 7.

As an example, in the present embodiment, the size of the partial image 64 is predetermined. As shown in FIG. 7, the image processing unit 52 sets a center line LC4 of the partial image 64 at a position deviated from a center line LC3 of the captured image 60 by the misregistration amount $\beta$, and determines a region having the predetermined size as the partial image 64, as a cutout range 63. Then, the image processing unit 52 performs so-called trimming processing to cut out the partial image 64 from the captured image 60 based on the determined cutout range 63. The image processing unit 52 outputs the cut partial image 64 to the display controller 54.

The display controller 54 has a function of performing a control to display the captured image 60 cut out by the image processing unit 52 as the projection image. Specifically, the display controller 54 outputs the image data of the partial image 64 to the OLED 26 and projects the partial image 64 from the OLED 26 to perform a control to display the partial image 64 that is a partial region of the captured image 60. As shown in FIG. 7, the displayed partial image 64 is an image in which there is no misregistration between the position of the real image 76R obtained in a case in which the user's right eye UR visually recognizes the real space 70 and the position of the subject image 62 (the subject image 73), that is, the image is similar in appearance.

Next, the action of the processor 41 of the present embodiment will be described. FIG. 8 shows a flowchart showing an example of the flow of display control processing by the processor 41 of the present embodiment. As an example, in the smartphone 12 of the present embodiment, the CPU 40 of the processor 41 executes the display control program 45 stored in the storage unit 44 to perform the display control processing of which an example is shown in FIG. 8 in a case in which an instruction to start imaging with the camera 25 by the user using the input device 48 is received.

In Step S100 in FIG. 8, the captured image acquisition unit 50 acquires the captured image 60 captured by the camera 25 as described above. In the present embodiment, since the captured image 60 is displayed as a live view image, the captured image 60 to be acquired is a motion picture.

In the next step S102, the image processing unit 52 derives the misregistration amount β as described above. Specifically, the image processing unit 52 acquires the parallax α, the subject distance D, and the focal length F. Then, the image processing unit 52 derives the misregistration amount β using the above-described equation (1).

In the next step S104, as described above, the image processing unit 52 determines the cutout range 63 in which the partial image 64 is cut out from the captured image 60. Specifically, the image processing unit 52 determines the cutout range of the cutout range 63 such that the center line LC4 of the partial image 64 is disposed at a position deviated from the center line LC3 of the captured image 60 by the misregistration amount β.

In the next step S106, as described above, the image processing unit 52 cuts out a region corresponding to the cutout range 63 determined in Step S104 from the captured image 60 as the partial image 64.

In the next step S108, the display controller 54 outputs the image data of the partial image 64 to the OLED 26 as described above and instructs the OLED 26 to start the projection to display the partial image 64 as a live view image. Accordingly, the right eye UR of the user can visually recognize the live view image (partial image) together with the real space.

Figure 9:
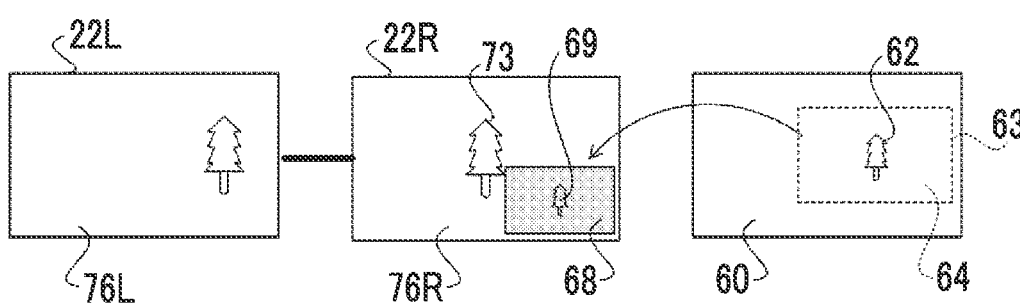
FIG. 9 is a diagram for explaining an example of a relationship between a partial image visually recognized by the user and a real image in the embodiment.

FIG. 9 shows an example of a relationship between the partial image 64 cut out from the captured image 60 and real images 76L and 76R visually recognized by the user. As shown in FIG. 9, the left eye of the user visually recognizes the real space 70 as the real image 76L by visually recognizing the real space 70 through the lens 22L for a left eye. In addition, the right eye UR of the user visually recognizes the real space 70 as the real image 76R by visually recognizing the real space 70 through the lens 22R for a right eye, and visually recognizes the partial image 64 as a partial image 68 by visually recognizing the partial image 64. As shown in FIG. 9, a position of the subject image 73 with respect to the real image 76R and a position of the subject image 69 with respect to the partial image 68 can be made the same. That is, the appearances of the real image 76R and the partial image 68 can be made the same.

According to the glasses-type information display device 1 of the present embodiment, it is possible to suppress the deviation between the real image 76R visually recognized by the user and the captured image 60 in a case in which the user visually recognizes the captured image 60 captured by the camera 25 together with the real space 70.

It should be noted that the technology of the present disclosure is not limited to the above-described embodiments, and various modifications can be made. For example, in the above-described embodiment, the aspect in which the user visually recognizes the real space 70 and the partial image 64 cut out from the captured image 60 through the lens 22R for a right eye of the AR glasses 10 with the right eye UR has been described, but the aspect in which the real space 70 and the partial image 64 are visually recognized is not limited to the above-described embodiment. For example, the aspect in which the real space 70 and the partial image 64 are visually recognized may be as in the following Modification Examples 1 to 4.

Modification Example 1

In the present modification example, a case in which the user visually recognizes the real space 70 and the partial image 64 cut out from the captured image 60 through the lens 22L for a left eye with the left eye will be described.

The AR glasses 10 of the present modification example are different from the AR glasses 10 of the above-described embodiment (refer to FIG. 1) in that the light guide plate 24 is provided in the transmission unit 20L for a left eye.

The display control processing of the present modification example only requires the display control processing of the above-described embodiment (refer to FIG. 8) and the same processing except that the image processing unit 52 cuts out the partial image 64 from the captured image 60 based on the parallax α between the left eye of the user and the camera 25.

Figure 10:
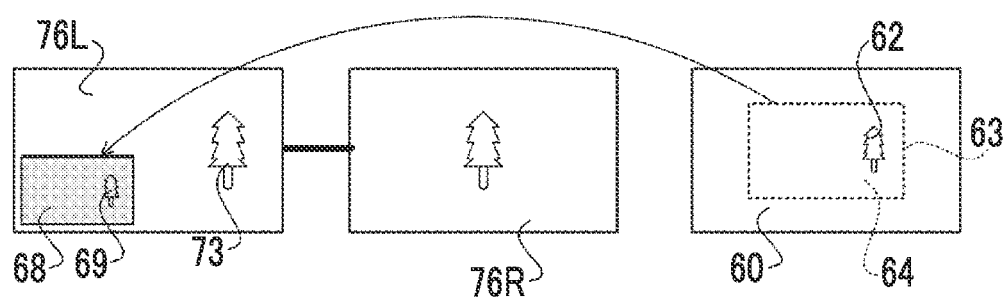
FIG. 10 is a diagram for explaining an example of a relationship between a partial image visually recognized by the user and a real image in Modification Example 1.

FIG. 10 shows an example of a relationship between the partial image 64 cut out from the captured image 60 and real images 76L and 76R visually recognized by the user in the present modification example. As shown in FIG. 10, the left eye of the user visually recognizes the real space 70 through the lens 22L for a left eye to visually recognize the real space 70 as the real image 76L, and visually recognizes the partial image 64 to visually recognize the partial image 64 as the partial image 68. In addition, the right eye UR of the user visually recognizes the real space 70 through the lens 22R for a right eye to visually recognize the real space 70 as the real image 76R.

According to the present modification example, as shown in FIG. 10, a position of the subject image 73 with respect to the real image 76L and a position of the subject image 69 with respect to the partial image 68 can be made the same. That is, the appearances of the real image 76L and the partial image 68 can be made the same.

Modification Example 2

In the present modification example, a modification example in a case in which the user visually recognizes the real space 70 and the partial image 64 cut out from the captured image 60 through the lens 22R for a right eye with the right eye will be described.

The AR glasses 10 of the present modification example are different from the AR glasses 10 of the above-described embodiment (refer to FIG. 1) in that the partial image 64 can be projected onto the entire lens 22R for a right eye by the light guide plate 24 provided in the transmission unit 20R for a right eye.

In the present modification example, the user visually recognizes the real space 70 with the left eye and visually recognizes the partial image 64 with the right eye UR. Therefore, in the display control processing of the present modification example, the image processing unit 52 performs processing of cutting out the partial image 64 from the captured image 60 based on the parallax α between the left eye of the user and the camera 25. Other types of processing only require the same processing as the display control processing (refer to FIG. 8) of the above-described embodiment.

Figure 11:
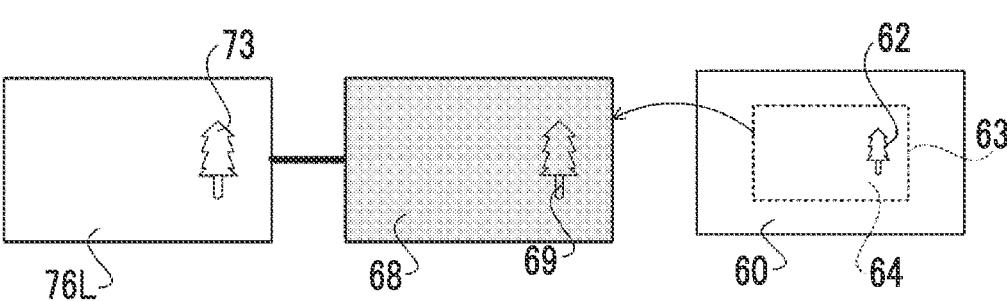
FIG. 11 is a diagram for explaining an example of a relationship between a partial image visually recognized by the user and a real image in Modification Example 2.

FIG. 11 shows an example of a relationship between the partial image 64 cut out from the captured image 60 and real images 76L and 76R visually recognized by the user. As shown in FIG. 11, the left eye of the user visually recognizes the real space 70 as the real image 76L by visually recognizing the real space 70 through the lens 22L for a left eye. In addition, the right eye UR of the user visually recognizes the partial image 64 to visually recognize the partial image 64 as the partial image 68. That is, since the partial image 68 is displayed on the entire lens 22R for a right eye, the right eye UR of the user does not visually recognize the real space 70 through the lens 22R for a right eye in the present modification example.

According to the present modification example, as shown in FIG. 11, a position of the subject image 73 with respect to the real image 76L visually recognized by the user with the left eye and a position of the subject image 69 with respect to the partial image 68 visually recognized by the user with the right eye UR can be made the same. That is, the appearances of the real image 76L and the partial image 68 can be made the same.

Modification Example 3

In the present modification example, a modification example in a case in which the user visually recognizes the real space 70 and the partial image 64 cut out from the captured image 60 through the lens 22L for a left eye with the left eye will be described.

The AR glasses 10 of the present modification example are different from the AR glasses 10 of the above-described embodiment (refer to FIG. 1) in that the light guide plate 24 is provided in the transmission unit 20L for a left eye and the partial image 64 can be projected onto the entire lens 22L for a left eye by the light guide plate 24.

In the present modification example, the user visually recognizes the real space 70 with the right eye UR and visually recognizes the partial image 64 with the left eye. Therefore, in the display control processing of the present modification example, the image processing unit 52 performs processing of cutting out the partial image 64 from the captured image 60 based on the parallax α between the right eye UR of the user and the camera 25. That is, in the display control processing of the present modification example, the same processing as the display control processing of the above-described embodiment (refer to FIG. 8) may be performed.

Figure 12:
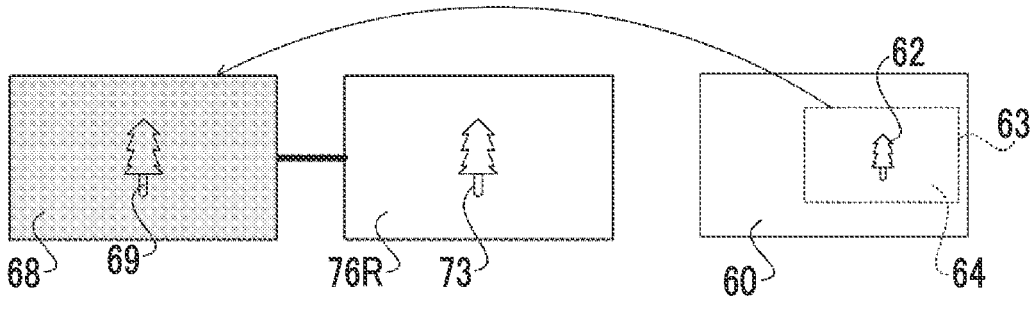
FIG. 12 is a diagram for explaining an example of a relationship between a partial image visually recognized by the user and a real image in Modification Example 3.

FIG. 12 shows an example of a relationship between the partial image 64 cut out from the captured image 60 and real images 76L and 76R visually recognized by the user. As shown FIG. 12, the left eye of the user visually recognizes the partial image 64 to visually recognize the partial image 64 as the partial image 68. That is, since the partial image 68 is displayed on the entire lens 22L for a left eye, the left eye of the user does not visually recognize the real space 70 through the lens 22L for a left eye in the present modification example. In addition, the right eye UR of the user visually recognizes the real space 70 through the lens 22R for a right eye to visually recognize the real space 70 as the real image 76R.

According to the present modification example, as shown in FIG. 12, a position of the subject image 73 with respect to the real image 76R visually recognized by the user with the right eye UR and a position of the subject image 69 with respect to the partial image 68 visually recognized by the user with the left eye can be made the same. That is, the appearances of the real image 76R and the partial image 68 can be made the same.

Modification Example 4

In the present modification example, a case in which the user visually recognizes the real space 70 and the partial image 64 cut out from the captured image 60 through the lens 22R for a right eye with the right eye UR, and visually recognizes the real space 70 and the partial image 64 cut out from the captured image 60 through the lens 22L for a left eye will be described.

The AR glasses 10 of the present modification example are different from the AR glasses 10 of the above-described embodiment (refer to FIG. 1) in that the light guide plate 24 is provided in both the transmission unit 20R for a right eye and the transmission unit 20L for a left eye.

In the display control processing of the present modification example, the partial image 64R is cut out from the captured image 60 based on the parallax α between the right eye UR of the user and the camera 25, and the cut partial image 64R is projected from the light guide plate 24 provided in the transmission unit 20R for a right eye. In addition, in the display control processing of the present modification example, the partial image 64L is cut out from the captured image 60 based on the parallax α between the left eye of the user and the camera 25, and the cut partial image 64L is projected from the light guide plate 24 provided in the transmission unit 20L for a left eye.

Figure 13:
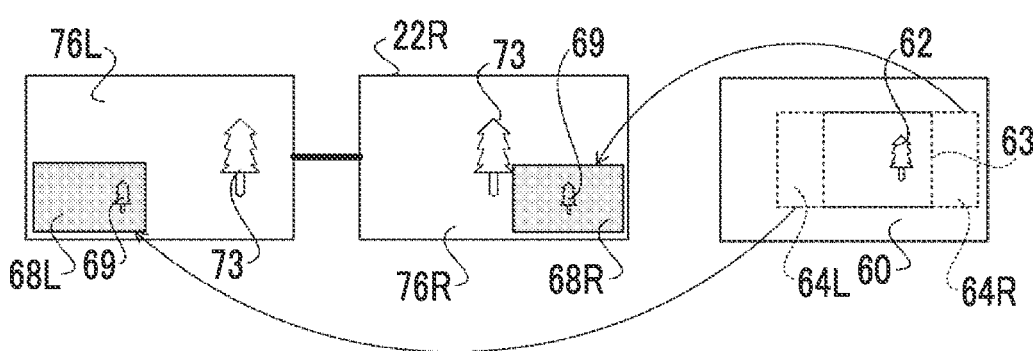
FIG. 13 is a diagram for explaining an example of a relationship between a partial image visually recognized by the user and a real image in Modification Example 4.

FIG. 13 shows an example of a relationship between the partial images 64L and 64R cut out from the captured image 60 and real images 76L and 76R visually recognized by the user in the present modification example. As shown in FIG. 13, the left eye of the user visually recognizes the real space 70 through the lens 22L for a left eye to visually recognize the real space 70 as the real image 76L, and visually recognizes the partial image 64L to visually recognize the partial image 64L as a partial image 68L. In addition, the right eye UR of the user visually recognizes the real space 70 as the real image 76R by visually recognizing the real space 70 through the lens 22R for a right eye, and visually recognizes the partial image 64R as a partial image 68R by visually recognizing the partial image 64R.

According to the present modification example, as shown in FIG. 13, a position of the subject image 73 with respect to the real image 76L and a position of the subject image 69 with respect to the partial image 68L can be made the same. That is, the appearances of the real image 76L and the partial image 68L can be made the same. In addition, a position of the subject image 73 with respect to the real image 76R and a position of the subject image 69 with respect to the partial image 68R can be made the same. That is, the appearances of the real image 76R and the partial image 68R can be made to be the same.

Further, the technology of the present disclosure may be, for example, as in the following Modification Example 5.

Modification Example 5

In the above-described embodiment and Modification Examples 1 to 4, an aspect in which the size of the cutout range 63 is predetermined has been described, but the size of the cutout range 63 may be variable. For example, the size of the cutout range 63, that is, the size of the partial image 64 may be determined based on the subject distance D.

Figure 14:
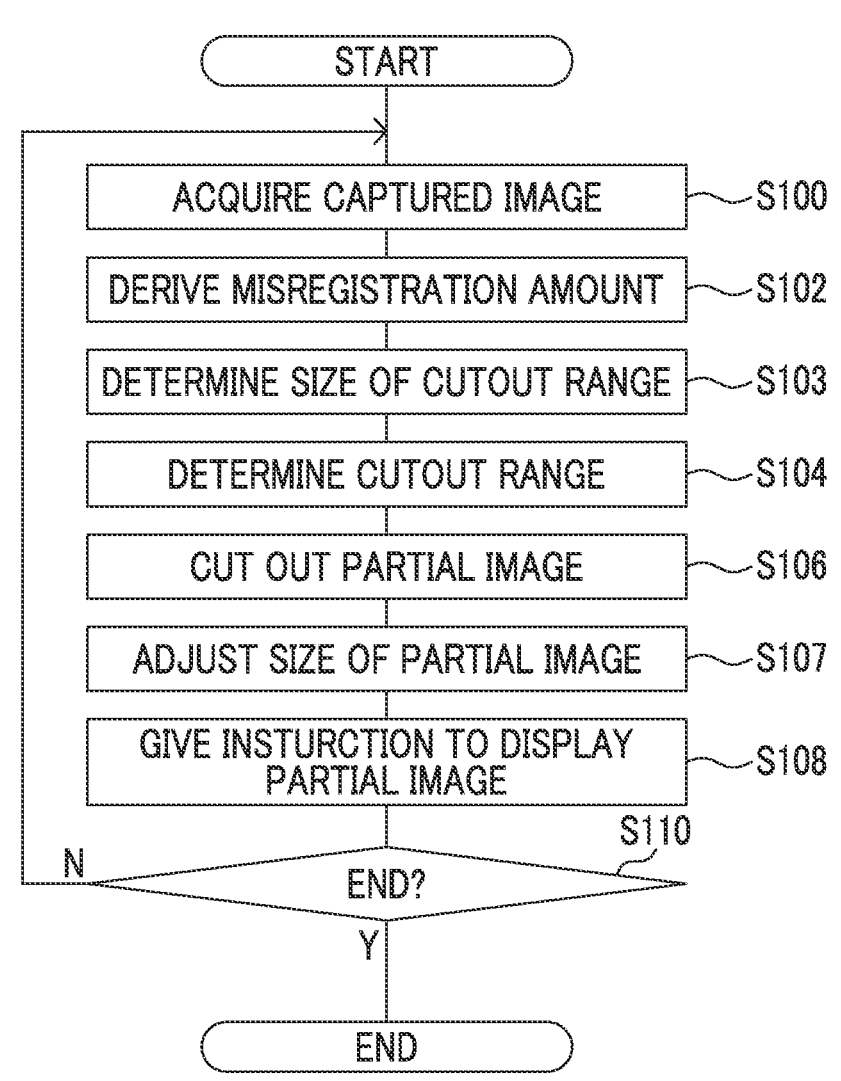
FIG. 14 is a flowchart showing an example of display control processing executed by a processor according to Modification Example 5.

FIG. 14 shows a flowchart representing an example of the flow of the display control processing in the present modification example. The display control processing of the present modification example shown in FIG. 14 is different from the display control processing (refer to FIG. 8) of the above-described embodiment in that processing of Step S103 between Step S102 and Step S104 is included and processing of Step S107 between Step S106 and Step S108 is included.

In Step S103 in FIG. 14, the image processing unit 52 determines the size of the cutout range 63 (partial image 64) as described above. As an example, in the present embodiment, a reference value of the size of the cutout range 63, that is, the size of the partial image 64, is predetermined based on the region of the real space 70 visually recognized by the user through the lens 22R for a right eye or the lens 22L for a left eye. Therefore, the image processing unit 52 corrects the reference value of the size of the cutout range 63 (partial image 64) based on the subject distance D and determines the corrected size as the size of the cutout range 63 (partial image 64).

In addition, in Step S107, the image processing unit 52 adjusts the size of the partial image 64 cut out from the captured image 60 in Step S106. As described above, in the present modification example, the size of the partial image 64 varies depending on the subject distance D. However, the size of the region of the AR glasses 10 projecting the partial image 64 is constant. Therefore, in the present modification example, the size of the cut partial image 64 is adjusted by enlarging or reducing the size based on the reference value of the above-described cutout range 63 (partial image 64).

By executing the display control processing shown in FIG. 14, even in the present modification example, in a case in which the user visually recognizes the captured image 60 captured by the camera 25 together with the real space 70, it is possible to suppress the deviation between the real images 76L and 76R visually recognized by the user and the captured image 60 as in the above-described embodiment and Modification Examples 1 to 4.

As described above, the glasses-type information display device 1 of the above-described embodiment and Modification Examples 1 to 5 causes at least one eye of the user to visually recognize the real space 70 and displays the captured image 60 obtained by imaging the real space 70 with the camera 25. The image processing unit 52 cuts out the partial image 64 that is a partial region from the captured image 60 captured by the camera 25 based on the parallax α between the eye of the user and the camera 25, and the display controller 54 displays the partial image 64 in a visually recognizable manner.

Accordingly, in the glasses-type information display devices 1 of the above-described embodiment and Modification Examples 1 to 5, it is possible to suppress the deviation between the real images 76L and 76R visually recognized by the user and the captured image 60. That is, according to the glasses-type information display device 1 of the above-described embodiment and Modification Examples 1 to 5, it is possible to suppress the deviation between the real images 76L and 76R visually recognized by the user, and the captured image 60 in a case in which the user visually recognizes the captured image 60 captured by the camera 25 together with the real space 70.

In the above-described embodiment and Modification Examples 1 to 5, an aspect in which the AR glasses 10 comprise the camera 25 as shown in FIG. 2, and the camera 25 is provided between the right eye and the left eye of the user has been described, but a position where the camera 25 is provided is not limited to the aspect shown in FIG. 2. For example, the camera 25 may be provided at a temple portion of the AR glasses 10. In addition, for example, the camera 25 may not be comprised in the AR glasses 10. Further, the camera 25 may not be comprised in the glasses-type information display device 1. In this case, examples of the camera 25 include a wearable camera that can be worn on the head of the user or the like. In any case, as long as the position where the camera 25 is provided is predetermined or the position where the camera 25 is provided is detectable, and as long as it has the configuration that can specify the parallax α.

In addition, in the glasses-type information display device 1 according to each of the above-described embodiments, the AR glasses 10 using the light guide plate 24 as a display unit have been described, but AR glasses 10 using a retinal display as a display unit may be used.

A shape of the glasses-type information display device is not limited to a general shape of glasses, an application, or a wearing portion. In addition, the glasses-type information display device may be a monocular type or a compound-eye type. A shape in which the left and right sides are connected like goggles may be used. In addition, it is not limited to devices wearing on a human head, like a so-called head-mounted display (for example, if a robot with the appearance of a dog simulates a function of a human, and the function of human eyes is achieved by a camera in the robot's knee, then the processor of the present disclosure is comprised in the image processing device mounted on the knee). Such an image processing device is also included in the technology of the present disclosure. In this way, in a case in which the user is not a human but a robot or the like, an aspect in which the user comprises a plurality of eyes may be employed.

In addition, the AR glasses 10 may comprise some or all of the functions of the processor 41 of the above-described embodiment, or a device other than the glasses-type information display device 1 may comprise the functions.

In addition, in the above-described aspects, various processors shown below can be used as the hardware structure of processing units that execute various types of processing, such as the captured image acquisition unit 50, the image processing unit 52, and the display controller 54. The various processors include a programmable logic device (PLD) that is a processor of which the circuit configuration can be changed after manufacture, such as a field programmable gate array (FPGA), a dedicated electrical circuit that is a processor having circuit configuration dedicatedly designed to perform specific processing, such as an application specific integrated circuit (ASIC), and the like in addition to a CPU that is a general-purpose processor functioning as various processing units by executing software (program) as described above.

One processing unit may be formed of one of these various processors, or may be formed of a combination of two or more processors of the same type or different types (for example, a combination of a plurality of FPGAs or a combination of a CPU and an FPGA). In addition, a plurality of processing units may be formed of one processor.

As an example in which a plurality of processing units are formed of one processor, first, as in the above-described embodiment, there is an aspect in which one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

Furthermore, more specifically, electrical circuitry in which circuit elements, such as semiconductor elements, are combined can be used as the hardware structures of these various processors.

In addition, an aspect in which the display control program 45 is stored (installed) in the storage unit 44 in advance has been described in each above-described embodiment, but the present disclosure is not limited thereto. The display control program 45 may be provided in a form where the display control program 45 is recorded in recording mediums, such as a compact disc read only memory (CD-ROM), a digital versatile disc read only memory (DVD-ROM), and a universal serial bus (USB) memory. In addition, the display control program 45 may be downloaded from an external device through a network.

In regard to the embodiment described above, the following supplementary notes will be further disclosed.

Supplementary Note 1

A processor included in a glasses-type display device that allows at least one eye of a user to visually recognize a real space and that displays a captured image obtained by imaging the real space with a camera, in which the processor performs display processing of displaying a partial image, which is a partial region of the captured image captured by the camera, in a manner visually recognizable by the user based on a parallax between the eye of the user and the camera.

Supplementary Note 2

The processor according to Supplementary Note 1, in which the processor determines a range in which the partial image is cut out based on a subject distance to a main subject included in the captured image and the parallax.

Supplementary Note 3

The processor according to Supplementary Note 2, in which the processor determines a display size of the partial image based on the subject distance.

Supplementary Note 4

The processor according to any one of Supplementary Notes 1 to 3, in which the parallax is a parallax between the eye of the user that visually recognizes the real space and the camera.

Supplementary Note 5

The processor according to according to any one of Supplementary Notes 1 to 4, in which the processor determines, according to the parallax between the one eye of the user and the camera, a region corresponding to the real space visually recognized with the one eye of the user as a range in which the partial image is cut out, and the processor displays the cut partial image in a manner visually recognizable by an eye other than the one eye of the user in the display processing.

Supplementary Note 6

The processor according to Supplementary Note 5, in which the processor displays the partial image in an entire visual field of the eye other than the one eye of the user in the display processing.

Supplementary Note 7

The processor according to any one of Supplementary Notes 1 to 4, in which the processor determines, according to the parallax between the one eye of the user and the camera, a region corresponding to the real space visually recognized with the one eye of the user as a range in which the partial image is cut out, and the processor displays the cut partial image in a manner visually recognizable by the one eye of the user in the display processing.

Supplementary Note 8

The processor according to Supplementary Note 7, in which the processor displays the partial image in a part in a visual field of the one eye of the user in the display processing.

Supplementary Note 9

The processor according to Supplementary Note 7, in which the processor performs cutting-out of the partial image and the display processing corresponding to each of a plurality of eyes of the user.

Supplementary Note 10

The processor according to any one of Supplementary Notes 1 to 9, in which the partial image is a live view image.

Supplementary Note 11

A display control device that performs a display control for a glasses-type display device that allows at least one eye of a user to visually recognize a real space and that displays a captured image obtained by imaging the real space with a camera, the display control device comprising at least one processor, in which the processor performs display processing of displaying a partial image, which is a partial region of the captured image captured by the camera, in a manner visually recognizable by the user based on a parallax between the eye of the user and the camera.

Supplementary Note 12

A display control method comprising: via a processor included in a glasses-type display device that allows at least one eye of a user to visually recognize a real space and that displays a captured image obtained by imaging the real space with a camera, performing display processing of displaying a partial image, which is a partial region of the captured image captured by the camera, in a manner visually recognizable by the user based on a parallax between the eye of the user and the camera.

Supplementary Note 13

A display control program causing a processor, which is included in a glasses-type display device that allows at least one eye of a user to visually recognize a real space and that displays a captured image obtained by imaging the real space with a camera, to execute a process comprising: performing display processing of displaying a partial image, which is a partial region of the captured image captured by the camera, in a manner visually recognizable by the user based on a parallax between the eye of the user and the camera.

What is claimed is:

1. A processor included in a glasses-type display device that allows at least one eye of a user to visually recognize a real space and that displays a captured image obtained by imaging the real space with a camera, wherein the processor performs display processing of displaying a partial image, which is a partial region of the captured image captured by the camera, in a manner visually recognizable by the user based on a parallax between the eye of the user and the camera, wherein the processor performs display processing, including cancelling a misregistration amount β corresponding to a distance between a position of a subject image in a real image and a position of a subject image in the captured image, wherein the processor performs display processing, including cutting out a partial region from the captured image as a partial image so as to cancel the misregistration amount β, and wherein the misregistration amount B is derived according to the following equation: $\beta = \alpha \times (F \div D)$, where F is a focal length of the camera, D is a distance between the camera and a subject, and a is the parallax between the eye of the user and the camera.

2. The processor according to claim 1, wherein the processor determines a range in which the partial image is cut out based on a subject distance to a main subject included in the captured image and the parallax.

3. The processor according to claim 2, wherein the processor determines a display size of the partial image based on the subject distance.

4. The processor according to claim 1, wherein the parallax is a parallax between the eye of the user that visually recognizes the real space and the camera.

5. The processor according to claim 1, wherein the processor determines, according to the parallax between the one eye of the user and the camera, a region corresponding to the real space visually recognized with the one eye of the user as a range in which the partial image is cut out, and the processor displays the cut partial image in a manner visually recognizable by an eye other than the one eye of the user in the display processing.

6. The processor according to claim 5, wherein the processor displays the partial image in an entire visual field of the eye other than the one eye of the user in the display processing.

7. The processor according to claim 1, wherein the processor determines, according to the parallax between the one eye of the user and the camera, a region corresponding to the real space visually recognized with the one eye of the user as a range in which the partial image is cut out, and the processor displays the cut partial image in a manner visually recognizable by the one eye of the user in the display processing.

8. The processor according to claim 7, wherein the processor displays the partial image in a part in a visual field of the one eye of the user in the display processing.

9. The processor according to claim 7, wherein the processor performs cutting-out of the partial image and the display processing corresponding to each of a plurality of eyes of the user.

10. The processor according to claim 1, wherein the partial image is a live view image.

11. A display control method comprising:

via a processor included in a glasses-type display device that allows at least one eye of a user to visually recognize a real space and that displays a captured image obtained by imaging the real space with a camera, performing display processing of displaying a partial image, which is a partial region of the captured image captured by the camera, in a manner visually recognizable by the user based on a parallax between the eye of the user and the camera, performing display processing, including cancelling a misregistration amount β corresponding to a distance between a position of a subject image in a real image and a position of a subject image in the captured image, wherein the processor performs display processing, including cutting out a partial region from the captured image as a partial image so as to cancel the misregistration amount β, and wherein the misregistration amount β is derived according to the following equation; $\beta = \alpha \times (F \div D)$, where F is a focal length of the camera, D is a distance between the camera and a subject, and α is the parallax between the eye of the user and the camera.

12. A non-transitory storage medium storing a display control program causing a processor, which is included in a glasses-type display device that allows at least one eye of a user to visually recognize a real space and that displays a captured image obtained by imaging the real space with a camera, to execute a process comprising:

performing display processing of displaying a partial image, which is a partial region of the captured image captured by the camera, in a manner visually recognizable by the user based on a parallax between the eye of the user and the camera, performing display processing, including cancelling a misregistration amount β corresponding to a distance between a position of a subject image in a real image and a position of a subject image in the captured image, wherein the processor performs display processing, including cutting out a partial region from the captured image as a partial image so as to cancel the misregistration amount β, and wherein the misregistration amount β is derived according to the following equation: $\beta = \alpha \times (F \div D)$, where F is a focal length of the camera, D is a distance between the camera and a subject, and α is the parallax between the eye of the user and the camera.

* * * * *